(12) United States Patent
Thakore

(10) Patent No.: US 11,716,207 B1
(45) Date of Patent: *Aug. 1, 2023

(54) SYSTEM AND METHOD FOR A DYNAMIC-PKI FOR A SOCIAL CERTIFICATE AUTHORITY

(71) Applicant: CABLE TELEVISION LABORATORIES, INC., Louisville, CO (US)

(72) Inventor: Darshak Thakore, Louisville, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 17/516,406

(22) Filed: Nov. 1, 2021

Related U.S. Application Data

(63) Continuation of application No. 15/699,897, filed on Sep. 8, 2017, now Pat. No. 11,165,591.

(51) Int. Cl.
*H04L 9/32* (2006.01)
*H04L 9/00* (2022.01)
*H04L 9/40* (2022.01)

(52) U.S. Cl.
CPC ........... *H04L 9/3268* (2013.01); *H04L 9/006* (2013.01); *H04L 63/0823* (2013.01)

(58) Field of Classification Search
CPC .... H04L 9/3268; H04L 9/006; H04L 63/0823
See application file for complete search history.

(56) References Cited

U.S. PATENT DOCUMENTS

| | | | |
|---|---|---|---|
| 8,010,786 B1* | 8/2011 | Ward | H04L 63/0823 713/156 |
| 9,021,255 B1* | 4/2015 | Aharoni | H04L 63/1483 713/168 |
| 9,215,231 B1* | 12/2015 | Bowen | H04L 63/1416 |
| 9,258,128 B1* | 2/2016 | Tytula | H04L 63/062 |
| 9,397,838 B1* | 7/2016 | Chen | H04W 12/06 |
| 9,979,716 B2* | 5/2018 | Seidl | H04L 9/006 |
| 10,263,789 B1* | 4/2019 | Popoveniuc | H04L 9/3268 |
| 10,447,683 B1* | 10/2019 | Loladia | H04W 12/71 |
| 2004/0059686 A1* | 3/2004 | Levesque | G06Q 20/04 705/71 |
| 2005/0076198 A1* | 4/2005 | Skomra | H04L 63/0823 713/156 |
| 2005/0166262 A1* | 7/2005 | Beattie | H04L 63/0823 726/5 |

(Continued)

FOREIGN PATENT DOCUMENTS

| | | | | |
|---|---|---|---|---|
| WO | WO-2009101549 A2 * | 8/2009 | ......... | H04L 63/0407 |
| WO | WO-2013151851 A2 * | 10/2013 | ........... | G06F 16/951 |

*Primary Examiner* — Michael Simitoski
(74) *Attorney, Agent, or Firm* — Josh C. Snider

(57) ABSTRACT

Dynamic-PKI social Certificate Authority (CA) systems and methods are provided, which generate and issue certificates at time of device deployment instead of time of manufacture. The provided systems and methods utilize an interface to initiate a Certificate Signing Request (CSR), and which then generates and signs the CSR with a public key. The signed CSR is then securely transmitted to a Certificate Signing Request Processor (CSRP), which undergoes an optional verification process and is then processed to return a signed certificate. The signed certificate is then directly or indirectly provided to the device for provisioning into the network.

19 Claims, 4 Drawing Sheets

(56) References Cited

U.S. PATENT DOCUMENTS

| | | | |
|---|---|---|---|
| 2008/0022103 A1* | 1/2008 | Brown | H04L 9/3268 713/175 |
| 2010/0049839 A1* | 2/2010 | Parker | H04L 43/00 709/221 |
| 2010/0138907 A1* | 6/2010 | Grajek | H04L 63/0823 709/217 |
| 2011/0093938 A1* | 4/2011 | Asokan | H04L 9/3263 713/175 |
| 2011/0145567 A1* | 6/2011 | Liu | H04M 15/48 713/175 |
| 2011/0185172 A1* | 7/2011 | Thayer | H04L 63/0823 713/156 |
| 2011/0213965 A1* | 9/2011 | Fu | H04L 63/0823 709/248 |
| 2012/0023327 A1* | 1/2012 | Nagasaki | H04L 63/0823 713/156 |
| 2012/0023560 A1* | 1/2012 | Yanagi | G06F 21/645 726/6 |
| 2012/0030469 A1* | 2/2012 | Hsueh | H04L 63/0823 713/175 |
| 2012/0089832 A1* | 4/2012 | Adelman | H04L 63/0407 713/156 |
| 2012/0179907 A1* | 7/2012 | Byrd | H04L 9/3268 713/156 |
| 2012/0216035 A1* | 8/2012 | Leggette | G06F 3/0605 713/157 |
| 2013/0263211 A1* | 10/2013 | Neuman | G06Q 20/322 726/1 |
| 2013/0311986 A1* | 11/2013 | Arrouye | G06F 8/61 717/175 |
| 2013/0318354 A1* | 11/2013 | Entschew | H04L 9/3247 713/175 |
| 2014/0134980 A1* | 5/2014 | Singh | H04W 12/069 455/411 |
| 2015/0052351 A1* | 2/2015 | Nodehi Fard Haghighi | H04L 63/0428 713/156 |
| 2015/0195252 A1* | 7/2015 | Walter | H04L 63/0272 726/6 |
| 2016/0087993 A1* | 3/2016 | Jindal | G06F 21/604 726/1 |
| 2016/0127353 A1* | 5/2016 | Thomas | H04L 9/006 713/156 |
| 2016/0261563 A1* | 9/2016 | Walter | H04L 63/101 |
| 2017/0041151 A1* | 2/2017 | Kommireddy | H04L 9/3228 |
| 2017/0244626 A1* | 8/2017 | Karren | H04L 41/0806 |
| 2017/0257360 A1* | 9/2017 | Gattu | H04L 63/10 |
| 2018/0060054 A1* | 3/2018 | Arrouye | H04L 67/10 |
| 2019/0074982 A1* | 3/2019 | Hughes | H04L 9/0863 |
| 2019/0296918 A1* | 9/2019 | Chang | H04L 9/006 |

* cited by examiner

SYSTEM AND METHOD FOR A DYNAMIC-PKI FOR A SOCIAL CERTIFICATE AUTHORITY

CROSS-REFERENCE TO RELATED APPLICATIONS

This application is a continuation of U.S. patent application Ser. No. 15/699,897, filed Sep. 8, 2017, which prior application claims the benefit of U.S. provisional Application No. 62/385,087, filed Sep. 8, 2016, the disclosures of which are hereby incorporated in their entireties by reference herein.

BACKGROUND

Existing systems require external configuration to tie a user's ownership with a device owned by the user. That is, in current Public Key Infrastructure (PKI) based systems, a certificate is typically either tied to a device (if provisioned by the manufacturer) or tied to a user/service provider (if provisioned by a service, e.g., PassPoint). This requires that the association between a device and its user/owner needs to be established separately and stored separately.

A PKI infrastructure typically consists of a Root Certificate Authority (CA) with one or more Intermediate CA's that issue end certificates. The Root CA is the trust anchor for the digital certificate. The end certificates are typically issued for specific usages and the issuance of the certificate typically requires the Certificate Recipient (or its proxy) to have an account with one of the Intermediate CA's. It is also typical that the Intermediate CA will have some verification procedure (often involving offline or out-of-band mechanisms) to verify the requester of the certificate before the Intermediate CA issues a certificate. All of these requirements typically pose a heavy burden on the process of certificate issuance and is one of the primary reasons that PKI systems have been deployed in limited cases.

Specific PKI systems have been deployed that either (1) require the user to go through the above steps to procure a certificate, which assumes the user understands the steps above, or (2) requires the manufacturer of a device to procure certificates in bulk and provision the certificates as part of the manufacturing process. The most common deployment of the former is the PKI for web traffic/domain validation and e-commerce. One example of deployment of the latter are OpenADR and other ecosystem specific PKI's where a set of CA's are approved as the Root CA's for the ecosystem and all end devices participating in the ecosystem contains the Root CA's in their trust store.

However, as mentioned above, the biggest hurdle in such deployments is around certificate issuance and management. Manufacturers typically like to avoid pre-provisioning certificates since it increases the cost and puts burden on their supply chain. Also, in the deployment situations explained above, the certificates are either tied to a domain for web PKI or tied only to a device for manufacturer PKI's.

SUMMARY

It would be beneficial for certificates to be issued such that both the device and the user of the device are associated within the certificate, thus avoiding the problems of the existing systems, as stated above. In addition, it would be beneficial to incorporate functionality within a certificate system that enables changing a certificate from a first user of a device to a second user of the same device. Such a system and method should be intuitive such that a user does not need to understand private keys or how to protect private keys. Such an intuitive system would increase adoption since ordinary users do not understand the intricacies and implications of the existing complex PKI systems and processes. Also, a system and method that provides for manufacturers to avoid pre-provisioning certificates would help manufacturers' supply chain and reduce cost.

The present Dynamic-PKI (D-PKI) for a Social Certificate Authority (CA) system and method solve the problems stated above by generating and issuing certificates at deployment time instead of manufacture time. In addition, the present system and method may also provide an automated protocol for certificate issuance and management. The present system and method, as described here, is implemented in an Internet of Things (IoT) ecosystem. The IoT ecosystem examples are merely presented here to convey an understanding of the present system and method in only one of its many possible implementations, and are not meant to be limiting in any way. The present system and method may be applied to other systems and ecosystems without departing from the scope herein.

BRIEF DESCRIPTION

FIG. 1 illustratively represents an exemplary deployment architecture for a Dynamic-PKI Social CA system, in an embodiment.

DETAILED DESCRIPTION

The Dynamic-PKI for a Social Certificate Authority (CA) system and method described here may issue one or more certificates to a device that asserts a device identity. Asserting a device identity is understood to mean asserting authenticity. In one example, asserting device identity is asserting authenticity from the manufacturer of the device in combination with device owner information. Alternatively, asserting device identity may be asserting just authenticity from the manufacturer of the device or just device owner information.

The Dynamic-PKI for a Social CA system and method facilitates the issuance of public key certificates (hereinafter, called "certificates") to one or more devices where a single certificate is designed to assert the devices' identity, a user's ownership, and may include one or more of the user's various identities in the certificate. Here, "various identities" includes, but is not limited to, the various usernames and/or user id's a user has generated for various systems and services. In the real world, a user has a driver's license and employee id's which they use for specific official purposes. In the digital world, they have, for example, a bank ID, an email ID, Facebook™ ID, Apple™ ID, etc. that are used to access specific systems or services. All of these are examples of a user's digital identity. In one example, the issued certificates may be utilized in various Internet of Things (IoT) ecosystems to enable interactions, such as machine-to-machine (m2m) communication. The IoT examples discussed here are merely specific use cases of a general Dynamic-PKI for a Social CA system and method which has a wide variety of applications.

In general, the following components cooperate in the present D-PKI architecture. One or more of the below components and additional components may be present in the system without departing from the scope herein:

- A Root CA (RCA), which is the main Certificate Authority that is trusted by all participants in an ecosystem.
- An Intermediate CA (ICA), which is a certificate authority having been issued a certificate by the RCA and capable of issuing certificates to other devices and Social CA's (see below).
- A Social CA (SCA), which is an end device that has been issued a certificate and is capable of signing/issuing new certificates to devices that are within a user's social network.
- A Certificate Signing Request Processor (CSRP), which is a service capable of receiving and processing a Certificate Signing Request (CSR) on behalf of a user. In the present system and method, a trust relationship exists between the CSRP and ICA from which it requests a certificate.
- A Certificate Recipient (CR), which is an end device or service that possesses the private key associated with a certificate.
- A Certificate Owner (CO), which is the user whose identity information is stored in the certificate and through whose account the CSC receives the CSR and validates the request.

Figure 1:
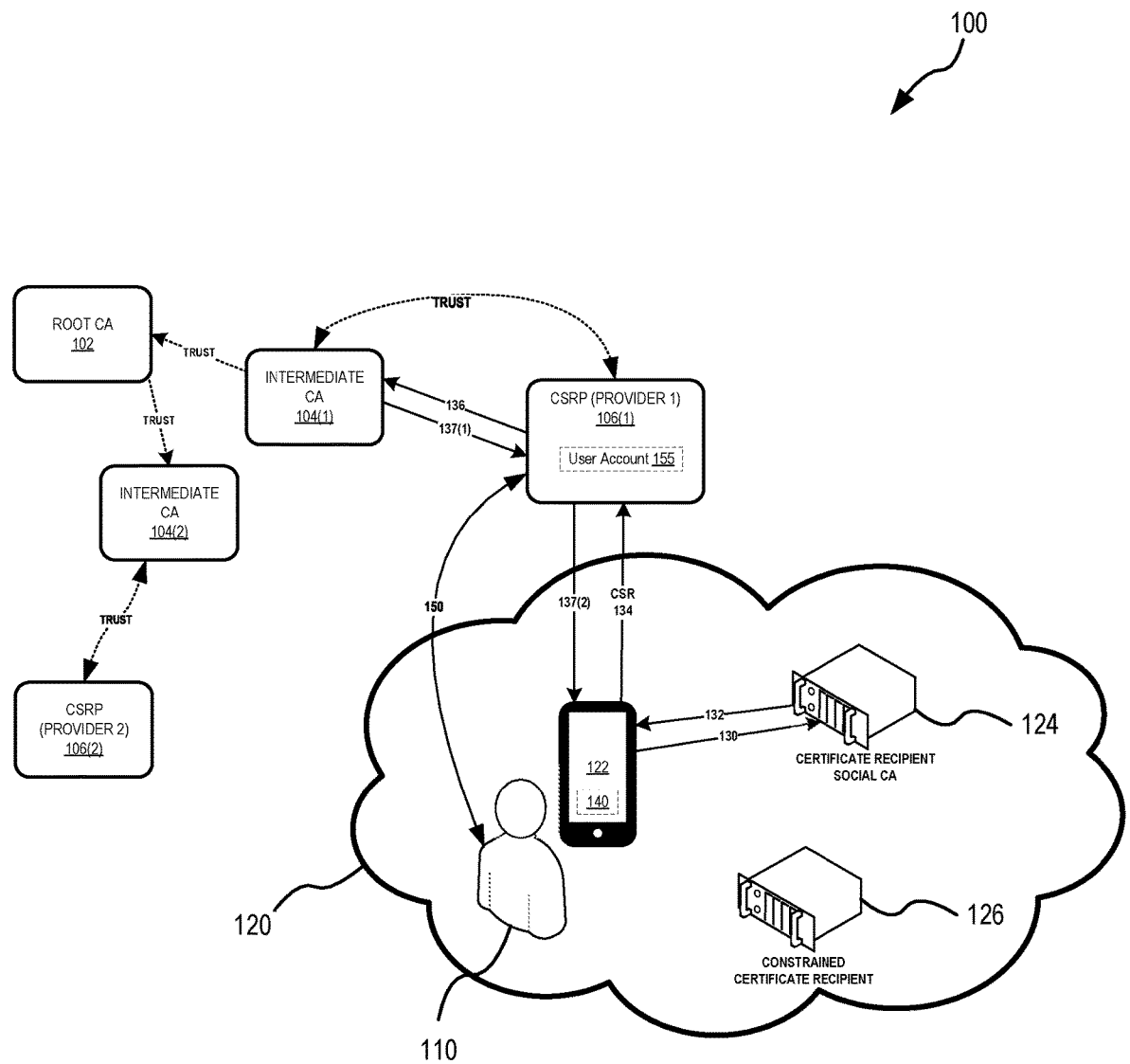

FIG. 1 shows one possible deployment architecture, which is shown as a Dynamic-PKI Social CA system 100. System 100 includes a Root CA 102 in communication with Intermediate CAs 104(1)-(2). Trust between Root CA 102 and an Intermediate CAs 104 is the same as that in a traditional PKI system. Intermediate CAs 104(1)-(2) are in communication with Certificate Signing Request Processors (CSRPs) 106(1)-(2), respectively. CSRP 106 acts as a front end for a user, such as user 110, and has a pre-established trust relation with one or more Intermediate CAs 104. CSRP 106(1) also has stored on it a user account 155 associated with user 110. For sake of simplicity, one user account 155 is shown, although more may exist within system 100 without departing from the scope herein. It will also be understood the number of user accounts is not necessarily equal to the number of users. That is, there may be more than one user account per user; for example, a single user may have a personal account and a business account, may have different accounts associated with different residences, may have different accounts associated with different activities or aspects of their lives, etc. Alternatively, or additionally, more than one user may be associated with a single user account, for example multiple users may be associated with a family account or group account. CSRP 106 is one unique feature within the present embodiment, and manages two aspects within the system, discussed further below. The first aspect of the system managed by CSRP 106 is that which relates to its role as a typical Registration Authority in a PKI system. In such a role CSRP 106 maintains and manages a user's account and processes CSR's on behalf of a user. The second aspect of the system managed by CSRP 106 is that which relates to its role validating and maintaining the user's various identities on behalf of the user. For example, when processing a CSR for the user, CSRP 106 provides functionality for the user to select which of their identities they would like included in the issued certificate.

System 100 also includes a user network 120, which itself includes a user 110, a constrained Certificate Recipient 126, a device 122, and a Certificate Recipient Social CA 124. Device 122 is in communication with both CSRP 106(1) outside of user network 120 and a Certificate Recipient Social CA 124 within user network 120. User network 120 may include more or fewer users 110, devices 122, Certificate Recipient Social CAs 124, and Constrained Certificate recipients 126 without departing from the scope herein. In the present example, CA 124 and Constrained Certificate recipient 126 are devices incorporated with functionality that may receive a certificate. These devices provide user 110 access to different services outside of user network 120.

Constrained Certificate recipient 126 and Certificate Recipient Social CA 124 are devices that are owned by user 110 and have been included in network 120. When a Certificate Recipient device is provisioned with a Social Certificate Authority certificate, the Certificate Recipient device plays the role of a Social Certificate Authority. In the present embodiment, such a device is Social CA 124. That is, Social CA 124 is a Certificate Recipient device that has been provisioned with a Social Certificate Authority certificate.

The Social CA 124 may be, for example, an end device owned by the user, examples of which include but are not limited to a gateway device, set-top box, and an IoT hub device. Social CA 124 is provisioned using D-PKI to act as a Certificate Authority within user 110's social network 120, which includes user 110's devices and the social connections. Some non-limiting examples of social connections include social connections within an electronic social network, such as connection on Facebook, LinkedIn, connections on Google+, etc. Social CA 124 is not limited to be a gateway device, set-top box, or an IoT hub device, but may be any other interconnected device such as, but not limited to, any IoT device (not shown), a home security system component (not shown), and an internet or television enabled component (not shown). Alternatively, Social CA 124 may be implemented as a service provided from a location remote from user 110 and network 120, such as a "cloud-based" service (not shown). Although not necessary, it is preferred that Social CA 124 it is a relatively powerful device and is mostly, if not always, on. All that is required is that Social CA 124 participates in the provisioning of devices on network 120 and Social CA 124 acts as a trust anchor and signs and issues certificates to devices within network 120.

User 110 is, for example, an end user and may be either an individual user or an organization. In another embodiment, user 110 is a separate device configured to facilitate the provisioning of other devices. In one example, user 110 initiates the process to onboard/provision one or more new devices on network 120. This process requires user 110 to be associate with the one or more new devices as an owner. Prior to onboarding/provisioning of the one or more new devices into network 120, user 110 must first establish 150 an account 155 with CSRP 106(1). After establishing user 110's account 155 with CSRP 106(1), user 110 may onboard/provision the one or more new devices into network 120.

A control app 140 is an application that facilitates the on-boarding of other devices. Control app 140 may be resident on an independent device or may be resident on a device to be onboarded. For example, control app 140 may reside on user 110's smart phone, PC, or some other interconnected device. Control app 140 may be installed as firmware or software during manufacture of the device or may be installed post-manufacture. In the embodiment of FIG. 1, control app 140 is installed on device 122, illustratively represented as a smart phone. User 110 utilizes control app 140 to initiate, provision, and manage certificates on one or more devices owned by user 110, such as device 122, or any other device user 110 would like to incorporate into network 120.

FIG. 1 also shows a CSR 134 being passed from device 122 to CSRP 106(1), a verified CSR 136 being passed from CSRP 106(1) to Intermediate CA 104(1), and a certificate 137 being sent from Intermediate CA 104(1) to CSRP 106(1). Further description regarding CSR 134, verified CSR 136, and certificate 137 are discussed the description of FIGS. 3 and 4, below.

One embodiment of the process of initiating, provisioning, and managing certificates is described generally immediately below, and shown in FIGS. 2-4.

Figure 2:
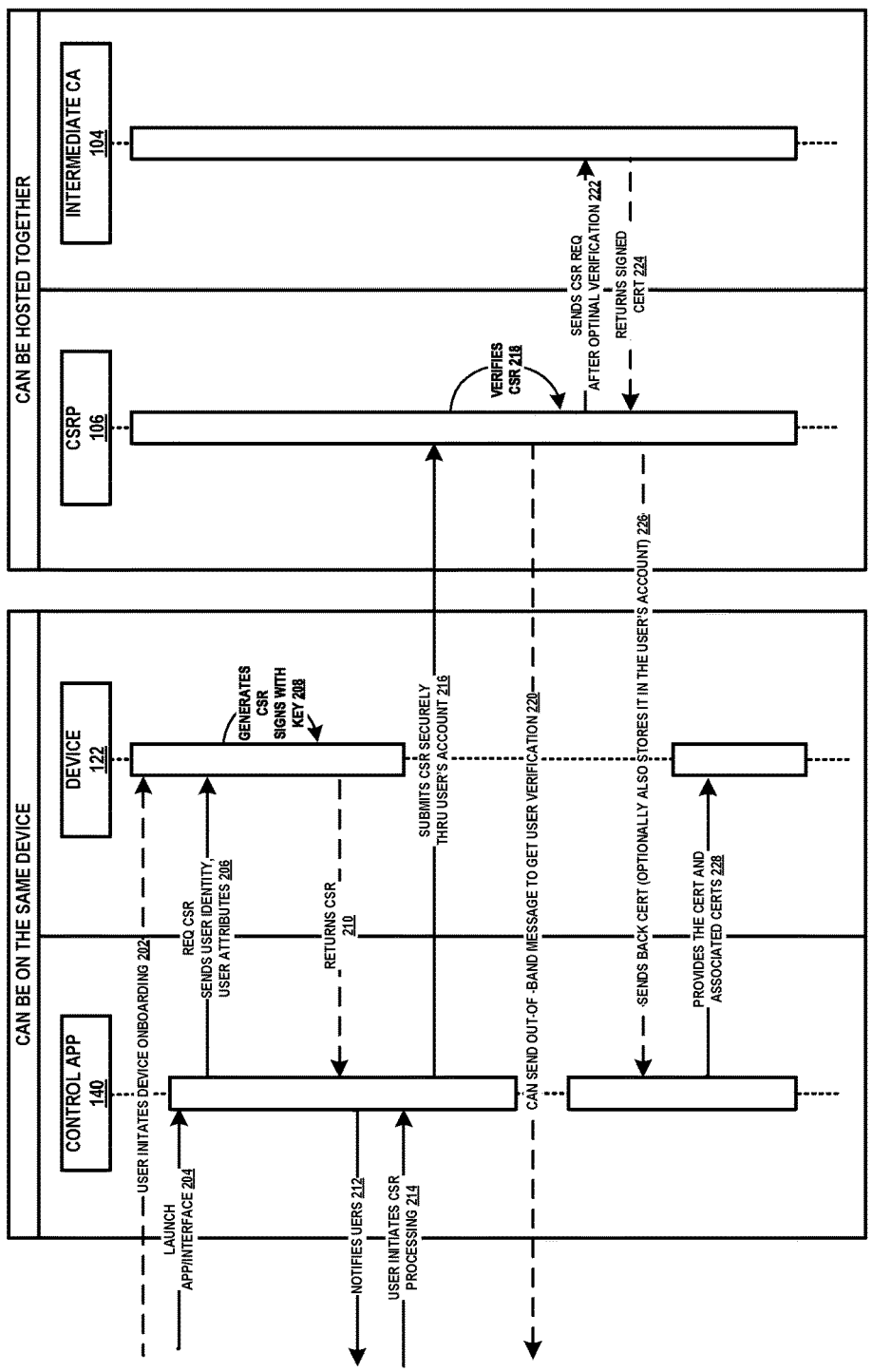
FIG. 2 shows a sequence diagram of the Dynamic-PKI Social CA protocol flow, in an embodiment.
Figure 2:
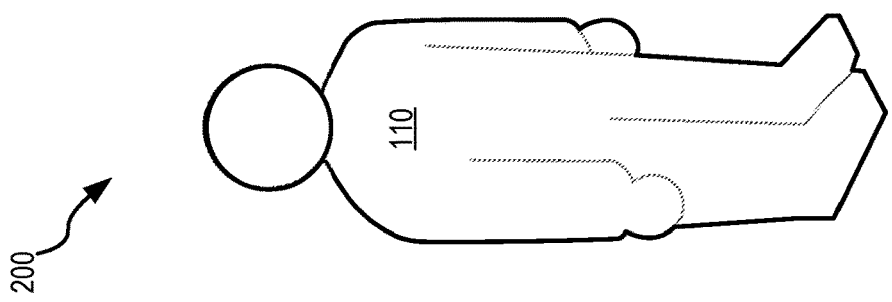
Figure 3:
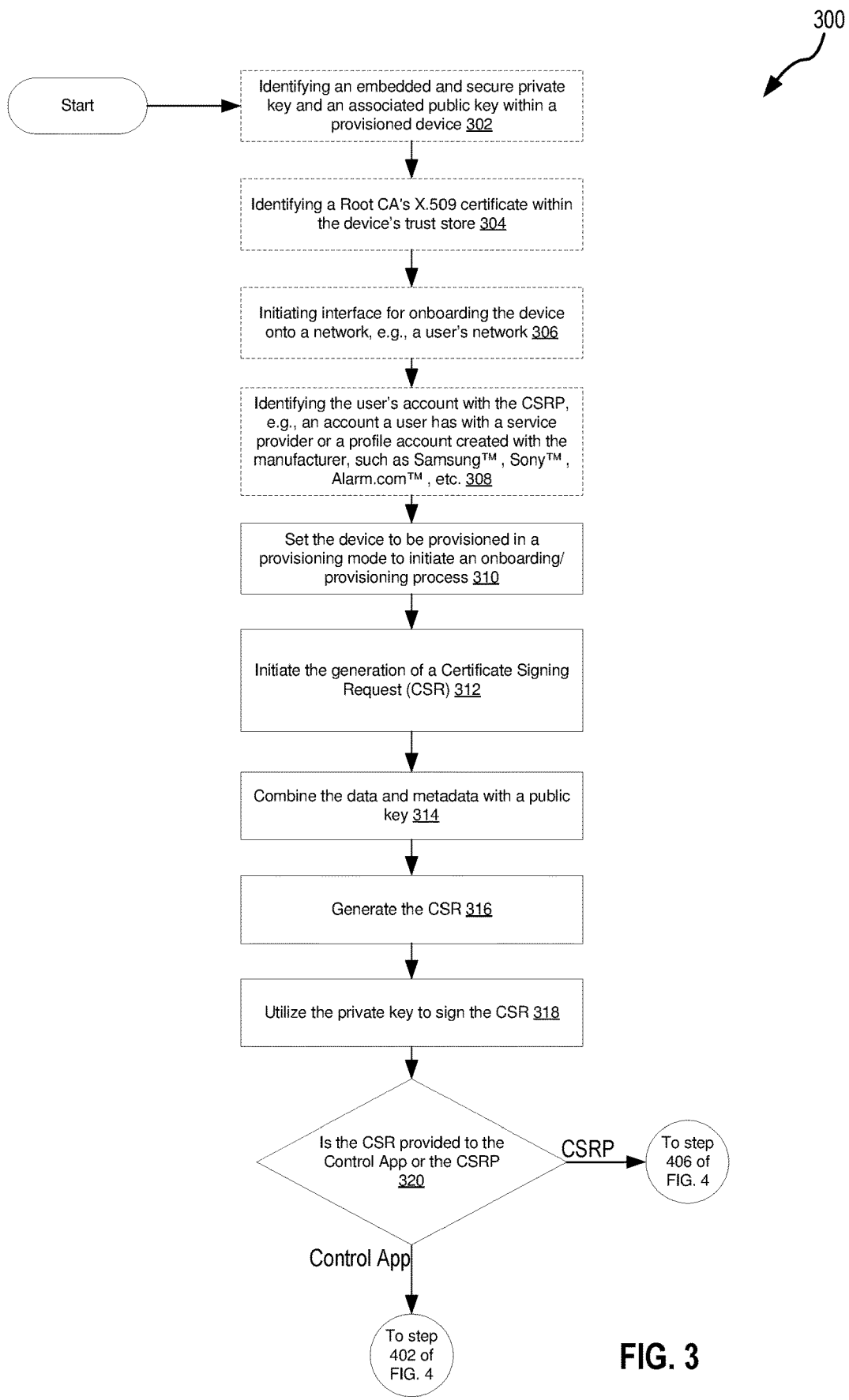
FIG. 3 shows a Dynamic-PKI Social CA method, in an embodiment.
Figure 4:
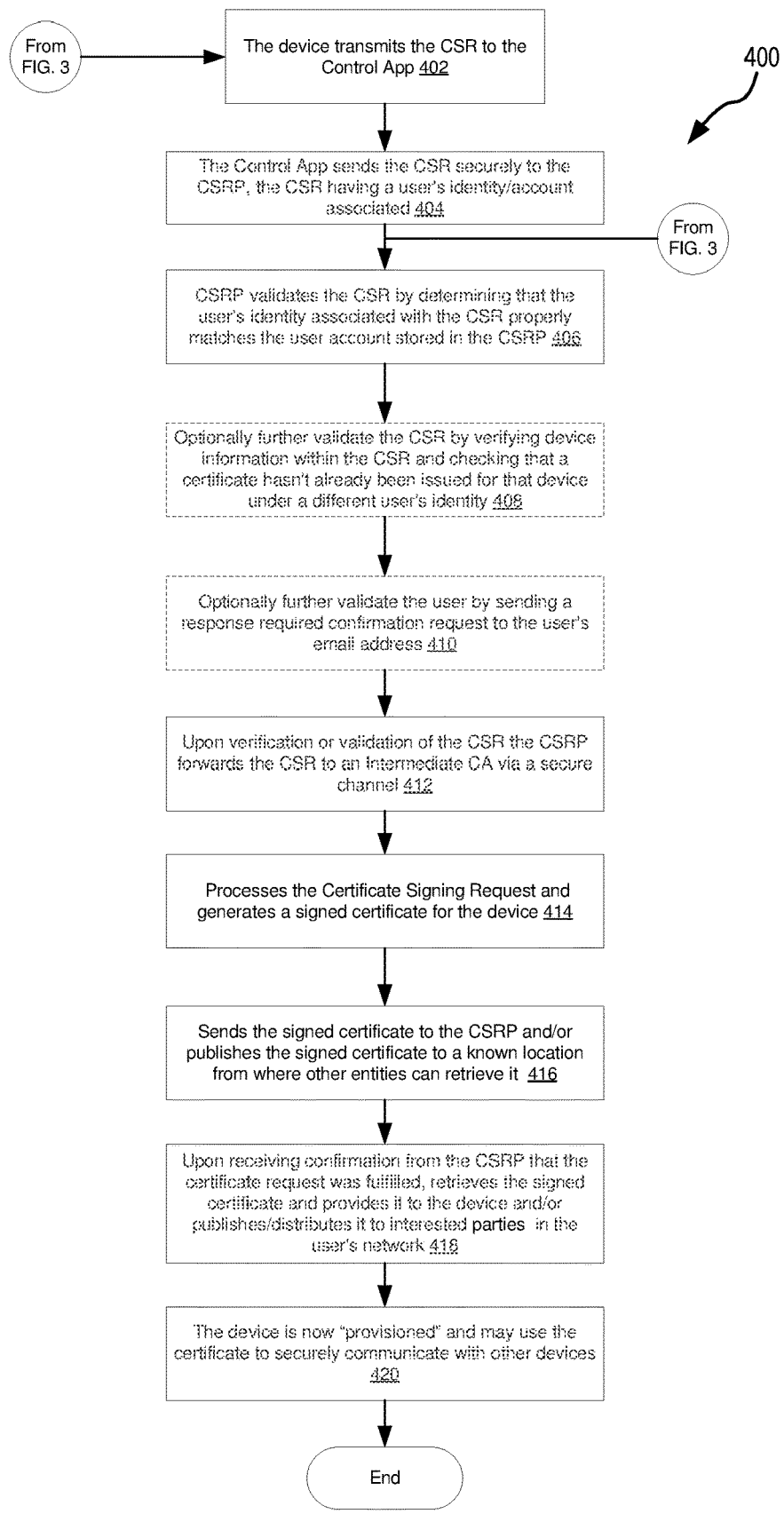
FIG. 4 shows one exemplary method of handling a signed CSR developed in the method of FIG. 3, in an embodiment.

FIGS. 2-4, which detail the provisioning of a device, are best viewed in combination. FIG. 2 shows a detailed sequence diagram of a protocol flow for provisioning a device into a user network, similar to network 120. FIGS. 3-4 illustrate an exemplary method for provisioning a device within the present Dynamic-PKI system. FIGS. 2-4 are described in relation to the Dynamic-PKI Social CA system 100 of FIG. 1 and use some of the same elements, namely user 110, device 122, control app 140, CSRP 106, and Intermediate CA 104.

Referring to FIG. 3, optional step 302 of D-PKI provisioning method 300 identifies an embedded and secure private key and an associated public key within, for example, device 122.

In optional step 304, method 300 identifies a certificate within the device's trust store. One example of step 304 is device 122 identifying a Root CA's X.509 certificate within device 122's trust store.

In optional step 306, method 300 initiates an interface for onboarding the device onto the user's network. In one example of step 306, app 140 resident on device 122 initiates a user interface (not shown) for providing functionality for accepting user 110 input and displaying information to user 110.

In optional step 308, method 300 identifies the user's CSRP account. In one example, step 308 is control app 140 identifying an account associated with user 120. Such account may include, but is not limited to, accounts with a service provider or a profile account created at device 122's manufacture, such as Samsung™, Sony™ Alarm.com™, etc.

In step 310, method 300 sets the device to be provisioned into a provisioning mode to initiate an onboarding/provisioning process. One example of step 310 is user 110 initiates 202 a provisioning mode on device 122 to prepare device 122 for provisioning into network 120. Optionally, user 110 also launches 204 control app 140 on device 122.

In step 312, method 300 initiates the generation of a Certificate Signing Request (CSR). In one example step 312, user 110 sends a command 206 to device 122 to generate a CSR, wherein the command may include one or more of identity data, metadata associated with the user, and metadata associated with the user's network.

In step 314, method 300 combines the data and metadata from step 312 with the public key of step 302 to generate the initial data for the CSR. In one example of step 314, device 122 combines data and metadata sent by user 110 with a public key stored within device 122.

In step 316, method 300 generates the CSR. In one example of step 316, device 122 generates a CSR, e.g., a PKCS #10 formatted request.

In step 318, method 300 signs the CSR with the public key. In one example of step 318, device 122 utilizes the public key to sign the CSR. In one example of step 312-318, device 122 generates and signs 208 the CSR with the public key.

In step 320, method 300 determines if the signed CSR is transmitted to the control app or the CSRP. In one example of step 320, device 122 returns 210 the signed CSR to the control app. If method 300 determines the signed CSR is returned to the control app, method 300 moves to step 402 of method 400, FIG. 4. If method 300 determines the signed CSR is to be transmitted to the CSRP, method 300 moves to step 406 of method 400, FIG. 4.

FIG. 4 shows an exemplary method for handling a signed CSR by a control app, such as control app 140.

In step 402, method 400 transmits the signed CSR to the control app. In one example of step 402, device 122 returns 210 the signed CSR to control app 140.

In step 404, method 400 sends the signed CSR securely to the CSRP using the user's identity/account. One example of step 404 is control app 140 on device 122 sending CSR 134 to CSRP 106(1).

In step 406, method 400 validates and/or verifies the CSR by determining that the user identity associated with the CSR matches the user account stored in the CSRP. One example of step 406 is CSRP 106(1) accessing user identity information in CSR 134 and comparing the user identity information with user account 155.

In optional step 408, method 400 further validates the CSR by verifying device information, such as, but not limited to, device manufacturer info, device serial number, device software version, device firmware version, etc., combined with the CSR. In this way, method 400 may determine if a certificate has already been requested or issued to a different (or the same) user for the device in question. One example of optional step 408 is CSRP extracting device information from CSR 134 and comparing the device information to device information stored in other user accounts stored on CSRP 106(1), any other CSRP 106, or any other account storage system.

In optional step 410, method 400 optionally validates the request was actually sent by the user account associated user by sending a confirmation request to the user's email address that must be responded to prior to issuance. One example of step 410 is CSRP 106(1) determining the user's e-mail address from the user's account 155, sending a validating e-mail to the user's account and waiting for a response to the validating e-mail prior to issuance.

In step 412, method 400, upon verification and/or validation of the CSR, forwards the verified CSR to an Intermediate CA via a secure channel. One example of step 412 is CSRP 106(1) forwarding 222 verified CSR 136 to Intermediate CA 104(1), between which trust exists.

In step 414, method 400, upon receiving the CSR from a CSRP, processes the CSR and generates a signed certificate for the device. One example of step 414 is Intermediate CA 104(1) processing verified CSR 136 and generating signed certificate 137(1), such as an X.509 certificate, for the device.

In step 416, method 400, sends the certificate back to the CSRP and/or publishes the certificate to a known storage device or system from where other entities can retrieve it. Some examples of "other entities" include, but are not limited to, other devices or services that want to authenticate the device that has been issued the certificate. Other entities would want to receive the certificate because they participate in establishing a secure communication channel with the device. One example of step 416 is Intermediate CA 104(1) sends 224 certificate 137(1) to CSRP 106(1).

In step 418, method 400, upon receiving the confirmation that the CSR was fulfilled and a signed certificate was received, sends the signed certificate to the control app, which provides the signed certificate to the device and/or publishes/distributes the signed certificate to interested parties in the user's network. An interested party in the user's network may be any device that requires a communication link with the device. One example of step 418 is, upon receiving the confirmation from the CSRP 106(1) that the CSR 134 was fulfilled, CSRP 106(1) sends 226 signed certificate 137(2) to control app 140 resident on device 122 and provides the signed certificate 228 to the device to be provisioned into network 120 and/or publishes/distributes the signed certificate 137(2) to interested parties in the user's network.

In step 420, method 400, now recognizes the device as a provisioned device and provisioned device may use the signed certificate to securely communicate with other devices within network 120.

Changes may be made in the above methods and systems without departing from the scope hereof. It should thus be noted that the matter contained in the above description, or shown in the accompanying drawings, should be interpreted as illustrative and not in a limiting sense. The following claims are intended to cover all generic and specific features described herein, as well as all statements of the scope of the present method and system, which, as a matter of language, might be said to fall there between.

The invention claimed is:

1. A method of implementing a dynamic public key infrastructure (D-PKI) for a Social Certificate Authority (CA) system including a Root CA and one or more Intermediate CAs, comprising:
   setting a device to be provisioned into a provisioning mode to initiate a provisioning process;
   initiating the generation of a Certificate Signing Request (CSR) by receiving a command including one or more of identity data, metadata associated with a user, and metadata associated with the user's network;
   combining a public key with one or both of the identity data and the metadata associated with the user to generate initial data for the CSR;
   generating the CSR based on the initial data for the CSR;
   transmitting the CSR to a Certificate Signing Request Processor (CSRP), the CSRP being separate from the Root CA and the Intermediate CAs;
   validating the CSR via the CSRP by determining that a user identity associated with the CSR properly matches a user account stored in the CSRP; and
   forwarding the CSR, from the CSRP upon validation of the CSR, to an Intermediate CA over a secure channel,
   wherein the CSR is configured with a user account associated with the user, and
   wherein the CSRP is configured to (i) maintain and manage the user account, and (ii) process the CSR on behalf of the user.

2. The method of claim 1, further comprising signing the CSR with a public key.

3. The method of claim 1, further comprising transmitting the CSR to a control application.

4. The method of claim 3, further comprising the control application sending the CSR securely to the Certificate Signing Request Processor (CSRP) with data associated with the user account.

5. The method of claim 4, wherein a user identity of the user account is associated with a plurality of user accounts.

6. The method of claim 5, wherein the number of user accounts is not equal to the number of users.

7. The method of claim 1, further comprising checking that a certificate has not already been issued for the device under a different user's account.

8. The method of claim 7, wherein checking that a certificate has not already been issued for the device under a different user's account is performed by analyzing information associated with the device within the CSR.

9. The method of claim 1, further comprising validating the user by sending a response required confirmation request to an email address associated with the user.

10. The method of claim 1, further comprising processing the CSR and generating a signed certificate for the device.

11. The method of claim 10, wherein an Intermediate CA performs the step of processing the CSR and generating the signed certificate.

12. The method of claim 11, wherein the signed certificate is an X.509 certificate device.

13. The method of claim 11, further comprising the Intermediate CA transmitting the signed certificate to the CSRP and/or publishing the signed certificate to a known location from where other entities can retrieve it.

14. The method of claim 13, wherein the other entities include devices or services that are instructed to authenticate the device that has been issued the certificate.

15. The method of claim 11, further comprising, upon receiving a confirmation from the CSRP that the certificate request was fulfilled, retrieving the signed certificate and providing it to the device and/or publishing the signed certificate to one or more interested entities in the user's network.

16. The method of claim 1, wherein the CSRP is further configured to (i) validate and maintain, on behalf of the user, at least two separate identities of the user associated with the stored user account, (ii) enable the user to select a first identity to be included in a certificate issued according to the CSR, and (iii) verify that the selected first identity matches one of the at least two separate identities of the user associated with the stored user account.

17. The method of claim 16, wherein the CSRP is further configured to verify the selected user identity by accessing user identity information in the CSR and comparing the user identity information in the CSR with user identity information in the user account.

18. The method of claim 1, wherein the step of validating the CSR further determines that metadata from the generated CSR properly matches the metadata associated with the user.

19. A method of implementing a dynamic public key infrastructure (D-PKI) for a Social Certificate Authority (CA) system including a Root CA and one or more Intermediate CAs, comprising:
   setting a device to be provisioned into a provisioning mode to initiate a provisioning process;
   initiating the generation of a Certificate Signing Request (CSR) by receiving a command including one or more of identity data, metadata associated with the user, and metadata associated with the user's network;
   combining a public key with one or both of the identity data and the metadata associated the user to generate initial data for the CSR;
   generating the CSR based on the initial data for the CSR;
   transmitting the CSR to a Certificate Signing Request Processor (CSRP) configured to (i) enable the user to select for the CSR a first identity from a plurality of different user identities associated with a user account of the user, (ii) store the user account and the plurality of different user identities, and (iii) validate the CSR; and forwarding the validated CSR from the CSRP to a first Intermediate CA of the one or more Intermediate CAs to issue a signed certificate.

* * * * *